Dec. 2, 1958    J. CRAGGS ET AL    2,862,604
EXTENSIBLE CONVEYOR

Filed Nov. 29, 1955    2 Sheets-Sheet 1

INVENTOR.
Joseph Craggs
Keith McCann
BY
Murray G. Gleeson
ATTORNEY

Dec. 2, 1958   J. CRAGGS ET AL   2,862,604
EXTENSIBLE CONVEYOR
Filed Nov. 29, 1955   2 Sheets-Sheet 2

INVENTOR.
Joseph Craggs
Keith McCann
BY
Murray A. Gleeson
ATTORNEY

United States Patent Office 2,862,604
Patented Dec. 2, 1958

2,862,604

EXTENSIBLE CONVEYOR

Joseph Craggs and Keith McCann, Taylorville, Ill., assignors to Goodman Manufacturing Company, Chicago, Ill., a corporation of Illinois Application November 29, 1955, Serial No. 549,603

20 Claims. (Cl. 198—139)

This invention relates generally to an extensible and contractible belt conveyor of the type which is supported upon a wire rope frame and more particularly to an improved conveyor capable of storing additional lengths of conveyor belting and wire rope frame, both of which can be payed out or taken in as desired for changing the length of the conveyor.

Structure according to the present invention is especially useful in following the advance of the working face in a mine or the like, although it is not so limited. Structure according to the present invention consists of a head or outby unit preferably having belt driving means mounted thereon, and a tail or inby unit having an idler for reversing the reaches of the belt and means for storing and paying out additional rope frame. The head or outby unit is preferably arranged in proximity to a shiftable carriage having a pulley providing reversing of the belt to provide a bight or loop which can be adjusted in its length as the inby unit advances. The movable carriage is connected to a power driven winch which is preferably arranged to control the tension on the belt within desired limits. The tail or inby unit is preferably mounted for movement upon crawler treads with suitable means for maintaining tension upon the rope frames, said means being also arranged to pay out additional lengths of rope framing in accordance with the advance of the inby unit.

With the foregoing considerations in mind it is a principal object of the invention to provide an improved extensible conveyor which can increase the length of its conveying reach in accordance with the advance of equipment discharging onto the conveyor or the advance of a working face in a mine or the like.

Another object is to provide in an extensible belt conveyor a novel control means for maintaining the wire rope support frame within desired limits of tension, and also for paying out additional lengths of wire rope support therefor as the conveyor is lengthened.

Other objects and important features of the invention will be apparent from a study of the specification following taken with the drawings which together show a preferred embodiment of the invention and what is now considered to be the best mode of practicing the principles thereof. Other embodiments may be suggested to those having the benefit of the teachings herein, and it is therefore intended that the scope of the invention not be limited by the precise embodiment herein shown, such other embodiments being intended to be reserved especially as they fall within the scope of the subjoined claims.

Figure 1:
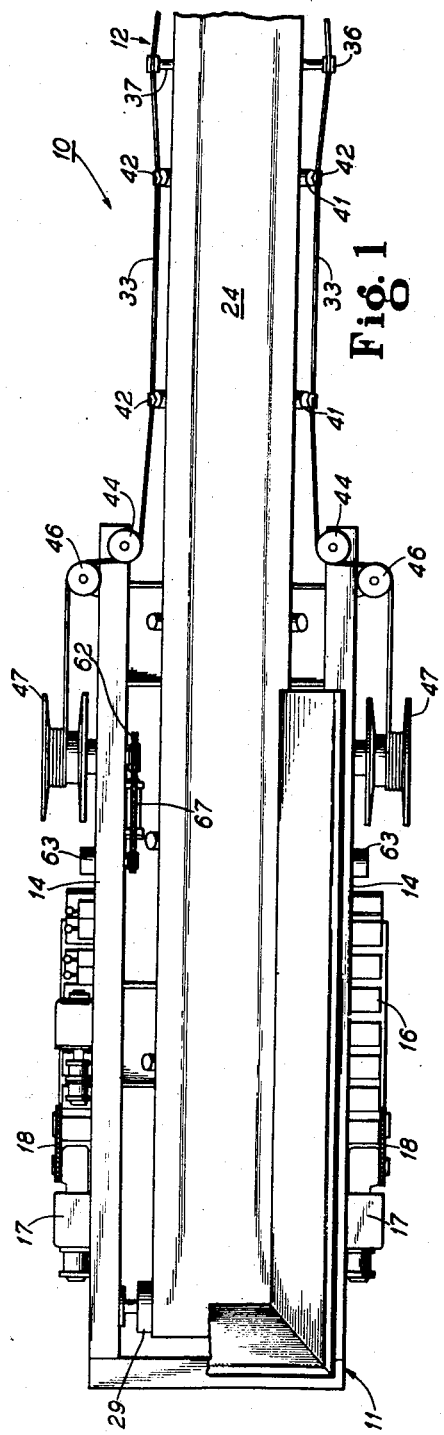
Fig. 1 is a plan view of the tail or material receiving section of an extensible conveyor having the improvements according to the present invention embodied therein.
Figure 2:
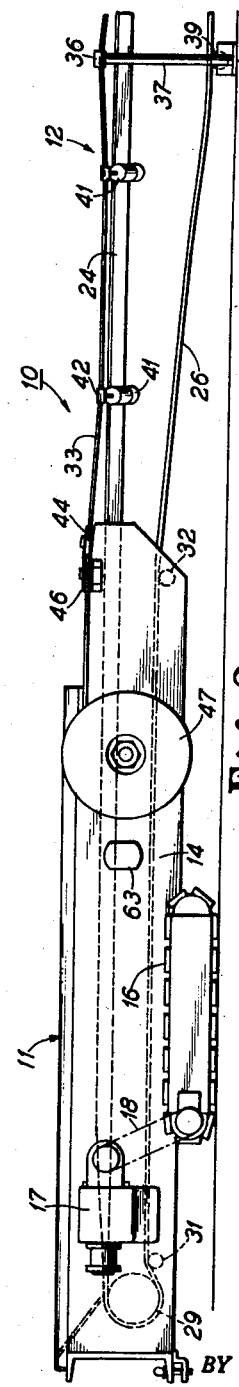
Fig. 2 is a side elevation thereof.
Figure 3:
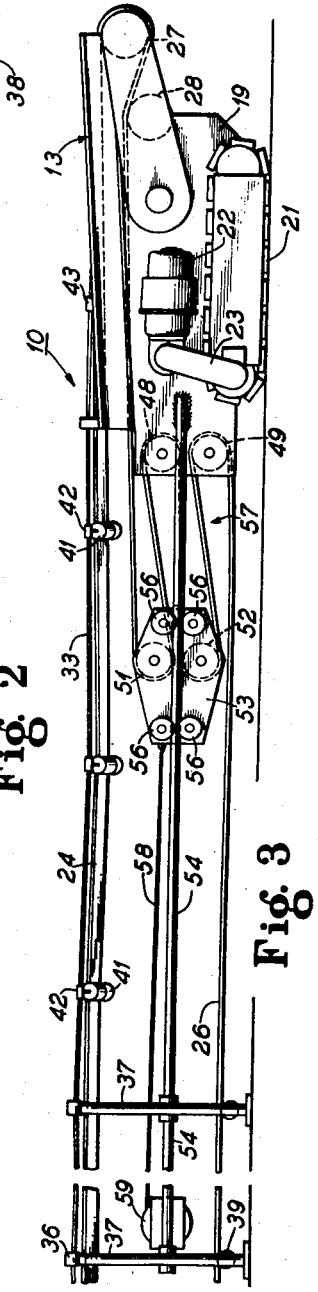
Fig. 3 is a side elevation view of a head or material discharging section of such extensible conveyor.

Referring now to Figs. 1 to 3 of the drawings, there is shown an extensible conveyor having the improvements according to the present invention embodied therein and referred to generally by the reference numeral 10. Such a conveyor includes a material receiving inby or tail section 11 which is connected by intermediate sections 12 to an outby or discharge section 13.

The inby or tail section 11 includes side frame members 14 which are mounted for movement upon crawler treads 16, the crawler treads being driven from a motor 17 connected by a chain sprocket 18 to each crawler tread 16.

The head or outby section 13 likewise has spaced frame members 19 which are mounted for movement upon spaced crawler treads 21, and power for driving each crawler tread consists of a drive motor 22 mounted upon the frame members 19, there being a sprocket chain 23 connecting the drive motor 22 with the crawler tread 21.

An endless belt having a conveying reach 24 and a return reach 26 is reeved around a drive pulley 27 at the head section 13, and is additionally trained around an idler pulley 28 thereat. The other end of the conveying reach 24 is reeved around an idler pulley 29 at the inby or tail section 11, and is additionally guided for movement upon idler pulley 31 and 32 at the tail section 11.

The conveying reach 24 is supported upon laterally spaced flexible strands 33, 33, the support strands being supported in brackets 36 of standards 37 having feet 38 in contact with a mine floor or the like. Standards 37 are spaced at regular intervals between the tail or inby section 11 and the head or outby section 13, and each includes an idler roller 39 for guiding the return reach 26.

The conveying reach 24 is supported upon troughing roller assemblies 41 which span the distance between the spaced strands 33, and which are anchored thereto by mounting brackets 42 at each end thereof.

As seen in Fig. 3, the strands 33 are anchored at 43 to the head section 13, and are trained around idler sheaves 44 and 46 at the tail or inby section 11, each support strand 33 being wound upon a winch 47 mounted on the side frame 14 of the tail or inby section 11.

The belt conveyor shown in Figs. 1 to 3 is of the extensible type and is arranged with storage loops or bights which can be shortened in accordance with the movement of the inby section 11 in following the advance of the working face of a mine or the like. The outby section 13 accordingly has fixed idler pulleys 48 and 49 which are mounted on the spaced frame members 19, 19. These idler pulleys cooperate with idler pulleys 51 and 52 which are mounted upon a movable carriage 53. The movable carriage is mounted upon laterally spaced rails 54 which extend from the outby section 13 to the support standard 37 next inby thereof as seen in Fig. 3, and additional rails 54 may also extend between other support standards 37. The carriage 53 is provided with upper and lower guide rollers 56 which embrace the rail 54, as shown, so that the carriage 53 may move back and forth along the rail 54.

The return reach 26 is reeved around the pulleys 49, 52, 48 and 51, to provide an extensible or contractable group of bights or loops 57.

The carriage 53 is connected by a strand 58 to a take up winch 59 which may be of the type as to impose a desired tension upon the strand 58, and at the same time impose a desired tension upon both the conveying reach 24 and the return reach 26.

Figure 4:
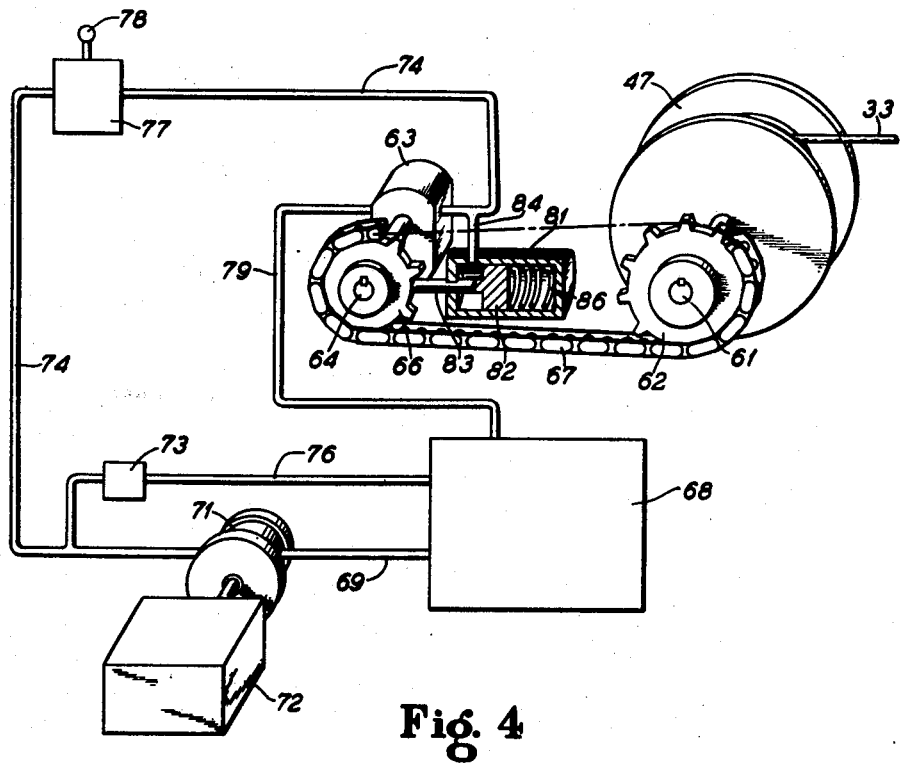
Fig. 4 is a perspective view of a take up device for imposing tension upon the rope strands of such a conveyor, and showing an hydraulic circuit and control therefor for such take up device.

Means are provided for paying out and winding in additional lengths of the support strands 33 when the tail unit 11 is advanced and retracted, to regulate the amount of tension in the strands 33, and also to lock the strands in position upon their winches 47 when a desired amount of tension has been reached. As seen in Fig. 4 the winch 47 is mounted fast to a shaft 61 having a sprocket 62 also fast thereto. A sprocket chain 67 constitutes a driving connection between the sprocket 62 and a sprocket 66 which is fast on a drive shaft 64 of a fluid motor-pump 63.

The fluid motor-pump 63 is connected in a fluid pressure circuit shown in Fig. 4 which consists of a tank or reservoir 68 which supplies fluid by means of a line 69 to a main pump 71 driven from a motor 72, a pressure relief valve 73 disposed in the output pressure conduit 74 from the main pump 71 discharging excessive pressure by means of a tank line 76 back to the reservoir 68.

A control valve 77 has an actuating handle 78 and is connected in the line 74 to the fluid motor-pump 63, spent fluid from the motor-pump 63 being returned to the tank 68 by means of a return line 79.

A fluid operated cylinder 81 has a locking piston 82 therein with a piston rod 83 extending therefrom which is arranged to engage one of the teeth of the sprocket 66 in the manner of a sprag to hold same in desired position, at the same time holding the winch 47 in a position to impose the desired amount of tension upon the strand 33. The piston rod end of the cylinder 81 is connected by a line 84 branching from the pressure line 74, and a spring 86 within the cylinder 81 normally urges the locking piston 82 and the piston rod 83 into engagement with the sprocket 66.

When the inby or tail section 11 is standing, that is not tramming either forward or backward, and the control valve 77 is opened by the handle 78 and the main pump 71 is being driven, the fluid in the conduit 74 is pressurized and this pressure is substantially simultaneously applied against the right-hand port of the motor-pump 63 (note Fig. 4) and through the line 84 to the underside of the locking piston 82 to shift the locking piston 82 to the right against the spring 86 to position the piston rod 83 out of engagement with the sprocket 66 so that the sprocket 66 may be rotated. When the inby or tail section is standing there is, in effect, no flow through the conduit 74 beyond the slight initial flow required to shift the locking piston 82, as explained above, to disengage the piston rod 83 from the sprocket 66. The running main pump 71 simply discharges the fluid through the relief valve 73 which may be set to relieve at any desired pressure. Thus, while the inby or tail section 11 is standing and after the piston rod 83 has been shifted to the unlocked position and the sprocket 66 is free to rotate there is a desired pressure in conduit 74 but substantially no flow therein and the flow of the pressure fluid is in the line 69 and the tank line 76.

It is to be noted further, at this time, that in the standing condition, stated above, that when the piston rod 83 is held out of engagement with the sprocket 66, by reason of the desired pressure, that the sprocket 66 will not rotate because the strands 33 are held in a given tension and that the given tension in the strands is determined by the valve used in setting the relief valve 73 for the desired pressure.

With the above conditions obtaining and when it is desirable to tram the inby or tail section 11 backwards, as the tension in the strands 33 begins to slack off the motor-pump 63 will rotate in a direction to wind the strands 33 onto the respective winches 47. Specifically, the desired pressure lying against the right-hand port of the motor-pump 63 (note Fig. 4) urges the sprocket 66, sprocket chain 67, sprocket 62 and winch 47 to rotate in a counterclockwise direction. Fluid then flows through the conduit 74, through the motor-pump 63 and on to the tank or reservoir 68 with whatever excess being supplied by the main pump 71 spilling over to the tank 68 through the relief valve 73 and tank line 76.

On bringing the inby or tail section 11 to a stop, the desired pressure is maintained against the underside of the locking piston 82 with the piston rod 83 being in the unlocked, non-engaging position relative to the sprocket 66. At the end of the tramming, the winding of the winch 47 stops, the sprockets 62 and 66 stop, the sprocket chain 67 stops and the flow of fluid through the conduit 74 and motor-pump 63 stops. The conditions as described above for the stationary position are re-established and the desired pressure in the line 84 and against the locking piston 82 is maintained with the piston rod 82 disengaged from the sprocket 66.

When it is desired to tram forwardly, for example, to follow the advance of a working face of a mine or a mining machine, the strands 33 must be payed out from the respective winches 47. To this end, the control valve 77 is held open by the actuation of the handle 78 and the main pump 71 is permitted to continue to run and the desired pressure remains in the conduit 74 and against the undersurface of the locking piston 82 so that the piston rod 83 is disengaged from the sprocket 66. When the inby or tail section 11 is moved forwardly and the tension in the strands 33 is increased so that the winch 47, sprocket 62, sprocket chain 67 and sprocket 66 will rotate in a clockwise direction and drive the motor-pump 63 as a "pump" with the outlet being the right-hand port with the motor-pump 63 pumping fluid from the return line 79 into the conduit 74 thereby bucking the desired pressure already lying there, causing a flow through line 74 which meets the main pump output at the entrance to tank line 76 with both pump outlets joining and flowing through tank line 76 and relief valve 73 to the tank 68. It is to be noted that in the unwinding or payout condition that the desired pressure in line 84 and against the undersurface of the locking piston 82 is increased to more firmly hold the piston rod 83 in the disengaged position since the desired pressure in conduit 74 is met by the pressure coming from the "pump" 63 and the combination of bucking pump outputs will raise the given pressure in line 84.

It is to be noted that at any time when the control valve 77 is held open while the main pump 71 is running that there will be a desired pressure in line 84 which acts against the undersurface of the locking piston 82 to hold the piston rod 83 in an unlocked disengaged position relative to the sprocket 66. This condition exists whether the inby or tail section 11 is standing, tramming forward or backward, or changing from one of the conditions to the other.

Thus, it will be seen that the inby or tail section 11 may be trammed forward to increase the effective length of the conveyor without disturbing, in any way, the connections and positioning of the standards 37 for the strands 33. And, likewise, the inby or tail section 11 may be trammed backward to decrease the effective length of the conveyor without disturbing the connections and positioning of the standards 37 except where it is necessary to entirely remove a standard 37 from the conveyor.

From the foregoing description it is thought evident that a valuable improvement has been made in the field of extensible conveying equipment. The support strands for the conveying reach of the conveyor are maintained at a desired tension at all times by the fluid take up motor and the sprag type brake therefor.

While the invention has been described in terms of a preferred embodiment thereof, its scope is intended to be limited only by the claims here appended.

We claim as our invention:

1. In an extensible rope frame conveyor, the combination of: discharge and receiving sections having strand means extending therebetween adapted to support a belt trained for orbital movement between the sections and means for moving the receiving section to vary the effective length of the conveyor while concurrently paying out or drawing in strand means relative to the receiving section at a predetermined tension.

2. In an extensible rope frame conveyor, the combination of: discharge and receiving sections having strand means extending therebetween adapted to support a belt trained for orbital movement between the sections and means for moving the receiving section toward the discharge section to decrease the effective length of the conveyor while concurrently drawing in the strand means toward the receiving section at a predetermined tension.

3. In an extensible rope frame conveyor, the combination of: discharge and receiving sections having flexible strand means extending therebetween adapted to support a belt and means for advancing the receiving section to extend the effective length of the conveyor while concurrently paying out strand means from the receiving section.

4. In an extensible conveyor having spaced sections movable relative to each other, strand means trained along a course between said sections adapted to support a belt and means for moving one of the sections relative to the other section in a direction generally aligned with said course to vary the effective length of said conveyor, the improvement comprising, in combination with the one section of means for selectively paying off or drawing in said strand means relative to said one section.

5. In an extensible conveyor having spaced sections movable relative to each other, strand means trained along a course between said sections adapted to support a belt and means for moving one of said sections toward the other section in a direction generally aligned with said course to decrease the effective length of the conveyor, the improvement comprising, in combination with the one section of means for drawing said strand means toward said one section.

6. In an extensible conveyor having spaced sections movable relative to each other, strand means trained along a course between said sections adapted to support a belt and means for moving one of said sections away from the other section in a direction generally aligned with said course to increase the effective length of the conveyor, the improvement comprising, in combination with said one section of means for paying off said strand means from said one section.

7. In an extensible strand sideframe conveyor, a movable section, strand means disposed along a course extending away from said section and being fixed at a location remote therefrom, belt support means carried by said strand means adapted to support a load-carrying reach of a belt and tramming means for moving said section in a direction generally aligned with said course to selectively increase and decrease the effective length of said conveyor, the improvement comprising, in combination with said section of means for selectively paying off and drawing in said strand means respectively from and to said section and strand tensioning means at said section operable to apply tension in said strand means to effectively support said belt support means during the movements of said section.

8. In an extensible strand sideframe conveyor, a movable section, strand means disposed along a course extending away from said section and being fixed at a location remote therefrom, belt support means carried by said strand means adapted to support a load-carrying reach of a belt and tramming means for moving said section in a direction generally aligned with said course to decrease the effective length of said conveyor, the improvement comprising, in combination with said section of means for drawing said strand means toward said section and strand tensioning means at said section operable to apply tension in said strand means to effectively support said belt support means during the movement of the section.

9. In an extensible strand sideframe conveyor, a movable section, strand means disposed along a course extending away from said section and being fixed at a location remote therefrom, belt support means carried by said strand means adapted to support a load-carrying reach of a belt and tramming means for moving said section in a direction generally aligned with said course to increase the effective length of said conveyor, the improvement comprising, in combination with said section of means for paying off said strand means from said section and strand tensioning means at said section operable to apply tension in said strand means to effectively support said belt support means during the movement of the section.

10. In an extensible rope frame conveyor, the combination of: discharge and receiving sections; strand means extending between said sections and adapted to support a belt; and means for advancing the receiving section to extend the effective length of the conveyor while concurrently paying out strand means from the receiving section at a predetermined tension, said means including a fluid operated winch.

11. In an extensible rope frame conveyor, the combination of: discharge and receiving sections; strand means extending between said sections and adapted to support a belt; and means for advancing the receiving section to extend the effective length of the conveyor while concurrently paying out strand means from the receiving section at a predetermined tension, said means including a fluid operated winch operable in a take up direction and means for imposing pressure thereon.

12. In an extensible rope frame conveyor, the combination of: discharge and receiving sections; strand means extending between said sections adapted to support a belt; and means for advancing the receiving section to extend the effective length of the conveyor while concurrently paying out strand means from the receiving section at a predetermined tension, said means including a winch and a fluid operated motor therefor, a control valve operable to impose pressure fluid upon said motor, and means operable upon release of pressure at said motor for locking said winch.

13. In an extensible rope frame conveyor, the combination of: a head section; a tail section; an extensible conveyor belt trained about said sections; drive means for orbitally moving said belt; a pair of flexible strands trained along opposite sides of said belt, each of said strands having one end thereof anchored remote from the tail section; roller means suspended between said strands for supporting said belt, and means for moving said tail section forward and backward relative to the head section; said tail section having means for each of said strands operable to take in and pay out said strands.

14. In an extensible rope frame conveyor, the combination of: separate head and tail sections each having a pulley rotatably mounted thereon, tramming means for moving the tail section forward and backward relative to the head section; an extensible conveyor belt trained about said pulleys; belt drive means in the head section for driving the head pulley to orbitally move said belt; means for applying a load supporting tension to said belt; a pair of flexible strands trained along said belt, each having one end anchored remote from the tail section; roller means suspended between said strands in supporting relation with said belt; said tail section having winding and unwinding means for the other end of each of said strands, and control means for said winding and unwinding means for maintaining tension in each of said strands between predetermined limits.

15. In an extensible rope frame conveyor having a head section; a tail section; a pulley in each section; an endless conveyor belt trained about said pulleys; drive means for orbitally moving said belt; a take up pulley movable toward and away from one of said first mentioned pulleys; said belt having a take up loop trained about said take up pulley; means urging said take up pulley in a direction to tension said loop; a pair of flexible strands trained along opposite sides of said belt, each of said strands having one end anchored remote from the tail section; troughing means suspended between said strands for supporting said belt and means for moving said tail section forward and backward relative to the head section, the improvement comprising, in combination with said tail section of supporting means for each of said strands operable to take in and pay out strand relative to said tail section concurrently with the movement of said take-up pulley in tensioning the loop.

16. In an extensible strand sideframe conveyor, a tail section, strand means disposed along a course extending away from said tail section and being fixed at a location remote from said tail section, an endless belt trained for orbital movement about said tail section and having a load-carrying reach movable from the tail section, belt support means carried by said strand means for supporting said load-carrying reach and tramming means for moving said tail section in a direction generally aligned with said course to change the effective length of said conveyor, the improvement comprising, in combination with the tail section of means for varying the length of said strand means including strand tensioning means at said tail section operable to apply tension in said strand means to effectively support said belt support means during the movement of the tail section, locking means carried by said tail section effective to lock movement of said strand means relative to the tail section, means biasing said locking means toward a locked condition, and means for releasing said locking means.

17. In an extensible strand sideframe conveyor, a tail section, strand means disposed along a course extending away from said tail section and being fixed at a location remote from said tail section, an endless belt trained for orbital movement about said tail section and having a load-carrying reach movable from the tail section, belt support means carried by said strand means and supporting said load-carrying reach and tramming means for moving said tail section in a direction generally aligned with said course to change the effective length of said conveyor, the improvement comprising, in combination with said tail section of means for varying the length of said strand means including strand tensioning means on said tail section, winding means about which said strand means is wrapped and rotatable respectively in winding and unwinding directions, fluid motor means drivably connected to said winding means and effective when pressurized to urge said winding means in a winding direction to tension said strand means and to reduce the length of the strand means extending from said tail section when the latter is trammed in the corresponding direction, said motor and winding means being drivable in an unwinding direction to enable pay-out of strand means upon tramming of said tail section in a direction to increase the length of the strand means extending from said tail section.

18. In an extensible strand sideframe conveyor, a tail section, a pair of flexible strands disposed in generally parallel relation along a course extending away from said tail section and being fixed remote from said tail section, an endless belt trained for orbital movement about said tail section and having a load-carrying reach movable from the tail section, belt support rollers carried by said strand means and supporting at least the load-carrying reach of said belt and tramming means for moving said tail section in a direction generally aligned with said course to change the effective length of said conveyor, the improvement comprising, in combination with said tail section of means for varying the length of said strands including a winding member on said tail section for each of said strands about which the respective strand is wrapped, a fluid motor drivably connected to each of said winding members, means for pressurizing said motors for urgence in a direction to tension said strands, locking means on said tail section biased toward a condition to lock said winding members against rotation, and means for releasing said locking means to enable said pressurizing means to tension said strands through said winding members during movement of the tail section in directions to vary the lengths of said strands.

19. In an extensible conveyor having spaced sections movable relative to each other, strand means trained along a course between said sections adapted to support a belt, support means for the strand means having connections with the latter intermediate said sections and means for moving one of said sections away from the other section in a direction generally aligned with said course to increase the effective length of said conveyor, the improvement comprising, in combination with the one section of means for paying off said strand means from said one section whereby the effective length of the conveyor may be extended without affecting said connections between the support means and the strand means.

20. In an extensible conveyor having spaced sections movable relative to each other, strand means trained along a course between said sections and adapted to support a belt, support means for the strand means having connections with the latter intermediate said sections and means for moving one of said sections relative to the other section in a direction generally aligned with said course to vary the effective length of the conveyor, the improvement comprising, in combination with the one section of means for selectively paying off or drawing in said strand means whereby the effective length of the conveyor may be extended or retracted without affecting the connections between the support means and the strand means.

References Cited in the file of this patent

UNITED STATES PATENTS 1,748,301    McKinlay  ------------ Feb. 25, 1930